May 20, 1941.  C. R. DAFOE  2,242,570
EXTENDIBLE TRACTOR FRAME
Filed June 15, 1940
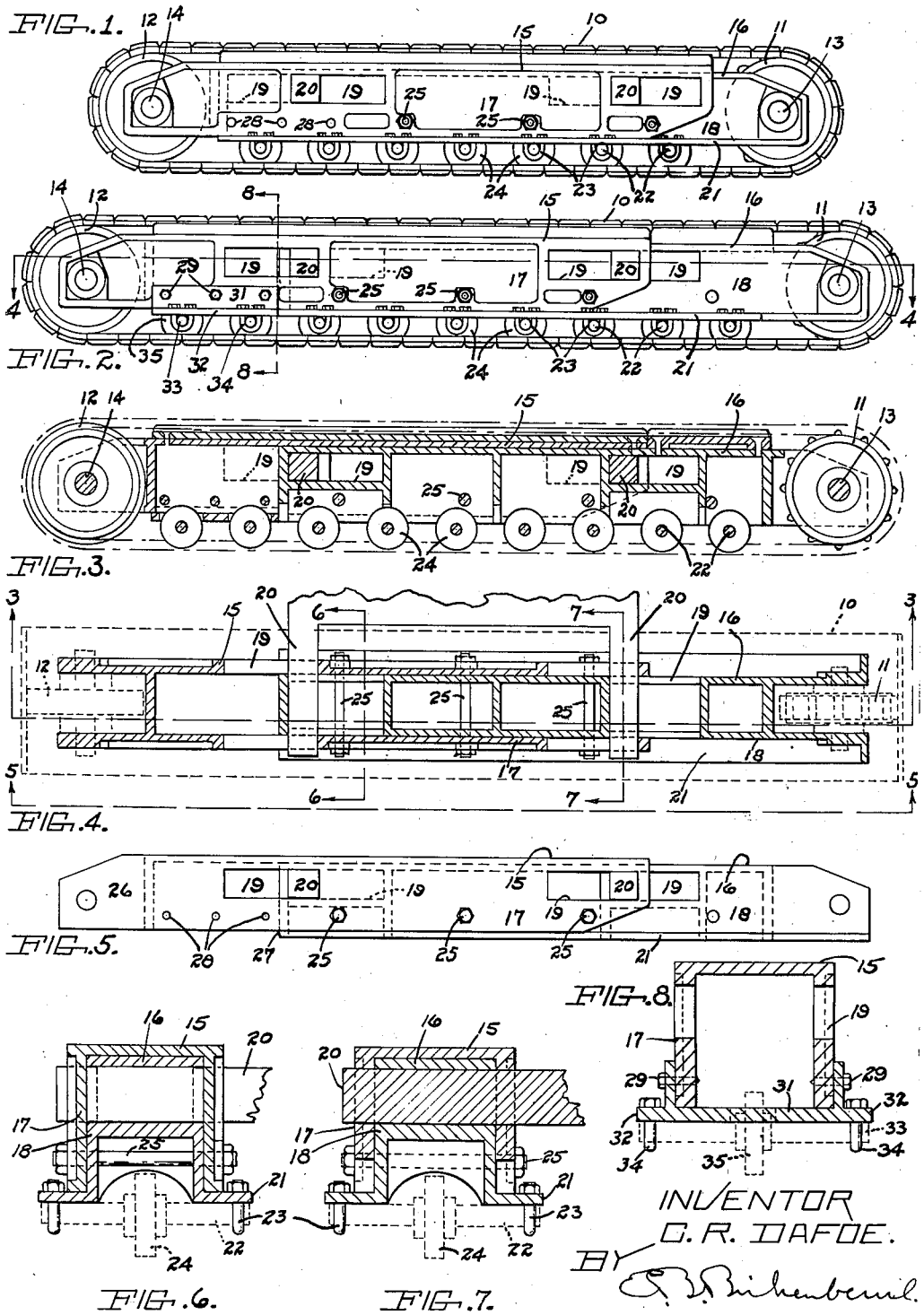
INVENTOR
C. R. DAFOE.
BY
ATTORNEY Patented May 20, 1941

2,242,570

UNITED STATES PATENT OFFICE 2,242,570

EXTENDIBLE TRACTOR FRAME

Carmie Roy Dafoe, Portland, Oreg.

Application June 15, 1940, Serial No. 340,751

4 Claims. (Cl. 305—9)

This invention relates generally to tractors and particularly to a tractor frame extension.

The main object of this invention is to construct a tractor frame extension whereby the length of the ground engaging member of the tractor may be varied—that is, increased at either end of the tractor or both ends thereof and restored to its original length with a minimum amount of effort and the expenditure of a relatively small amount of time.

The second object is to construct an extension of the class described affording the utmost rigidity to the frame of the tractor without objectionably increasing its weight, and at the same time better adapting the tractor to the various kinds of work it may be called upon to perform.

The third object is to construct a device of the class described wherein the maximum amount of rigidity is obtainable where most needed and in which the parts themselves so interlock that the extendible members are in reality as strong as unitary construction.

These and other objects are accomplished in the manner set forth in the following specification as illustrated in the accompanying drawing, in which:

Fig. 1 is a side elevation of a ground engaging unit of the crawler type in its shortened form.

Fig. 2 is a view similar to Fig. 1 showing the device in an extended form.

Fig. 3 is a view similar to Fig. 2 showing the frame cut away in longitudinal section along the line 3—3 in Fig. 4.

Fig. 4 is a horizontal section through the side frame taken along the line 4—4 in Fig. 2.

Fig. 5 is a side elevation of Fig. 4 taken along the line 5—5 in Fig. 4.

Fig. 6 is a section taken along the line 6—6 in Fig. 4.

Fig. 7 is a section taken along the line 7—7 in Fig. 4.

Fig. 8 is a section taken along the line 8—8 in Fig. 2.

Similar numerals refer to similar parts through the several views.

Referring in detail to the drawing there is shown a track 10 of the crawler type which passes around the usual sprocket wheel 11 and the wheel 12 which are provided with short shafts 13 and 14.

Referring more particularly to my invention, same will be seen to consist of a pair of telescopic channels 15 and 16, the latter of which is slidably mounted within the former. The side walls 17 of the channel 15 and the side walls 18 of the channel 16 are provided with elongated slots 19 through which extend the transverse supports 20.

It is desirable to provide the member 16 with the flanges 21 along its lower edges. It is to the underside of these flanges 21 that the shafts 22 are secured by means of the U-bolts 23. On the shafts 22 are mounted the rollers 24 which engage the under run of the track 10 between the wheels 11 and 12.

Bolts 25 may be employed to clamp the members 15 and 16 together. Obviously, any other suitable means for doing so would be satisfactory.

It will be noted in Fig. 5 that the portion 26 projects beyond the end 27 of the member 16. The portion 26 is provided with the bolt holes 28 to receive the bolts 29 which pass horizontally through the member 15 only.

Secured to the end 26 by means of the bolts 29 which pass through the holes 28 is the inverted channel 31 to whose flanges 32 are secured the shafts 33 by means of the U-bolts 34. On the shafts 33 are rollers 35 which are similar in construction to the rollers 24.

In the operation of the device, if it is desired to lengthen out the tractor frame from the position shown in Fig. 1 to the position shown in Fig. 2, it is only necessary to withdraw the bolts 25 and by means of pinch bars or other equipment, slide the parts 15 and 16 to the position shown in Fig. 5. It will then be necessary to add the inverted channel 31 with its attached rollers 35 and the extending operation is completed. Obviously, either or both ends of the tractor may be extended with equally advantageous results and without departing from the spirit of this invention.

When the tractor frame is extended to any intermediate position between its maximum and minimum lengths, it will be seen that the members 20 can float in the slots 19. This intermediate spacing is seldom required but when it is, hardwood filler blocks (not shown) are used to prevent movement of members 20 in the direction of travel of the tractor.

While I have thus illustrated and described my invention, it must be understood that numerous details of construction may be varied considerably without departing from the true spirit of this invention and although I am not claiming the device broadly, I do intend to claim all such forms and modifications as fall fairly within the appended claims.

I claim:

1. A tractor frame extension consisting of a pair of horizontal inverted channels telescopically arranged and outwardly flanged along the lower edges thereof, rollers disposed along the under side of said frame and attached thereto, track laying wheels disposed at opposite ends of said telescopic unit and having a track laying chain passing around said wheels and under the rollers secured to said telescopic member and means for adjusting the relative positions of opposite ends of said channel shaped members.

2. An extendible tractor frame consisting of a pair of elongated channels telescopically disposed, having transverse openings in the side walls thereof for the reception of transverse supports extending from the tractor body, said openings being elongated in a horizontal direction and adapted to permit a relative sliding movement of said telescopic members for the purpose of varying the length of the wheel base of the tractor and means for holding said members against sliding movement while the wheel base length is not being changed.

3. In an extendible tractor frame, the combination of an elongated channel shaped frame member having horizontal slots formed transversely therethrough along the length thereof, similarly slotted channel member forming an extension for said first mentioned channel, transverse supports slidably extending into said slots and adapted to permit the relative longitudinal movement of the channel shaped members, means for clamping the channel shaped members against movement, wheels mounted at opposite ends of said channel members, rollers mounted on the underside of said channel members and a ground engaging chain passing around said wheels and rollers, said chain being extendible in length to accommodate changes in spacing of said wheels.

4. In an extendible tractor frame, the combination of a pair of telescopically arranged channel members having slots formed therein transversely with the length thereof, bars upon which a power unit may be supported and extending horizontally through the slots in both members in a manner to permit longitudinal movement of said members with relation to each other and with relation to said supports, sprocket wheels mounted at opposite ends of the pair of channel members, a ground engaging chain passing around said wheels, rollers attached to one frame for supporting said frame in a contracted position and additional rollers attachable for supporting the extended portion of said frame, when the wheels are moved apart for the purpose of extending the wheel base of a tractor.

CARMIE ROY DAFOE.